Aug. 21, 1956 W. A. PITTS 2,759,448
WARNING DEVICE FOR PISTON CYLINDERS
Filed Sept. 30, 1953
FIG. 1.
FIG. 2.
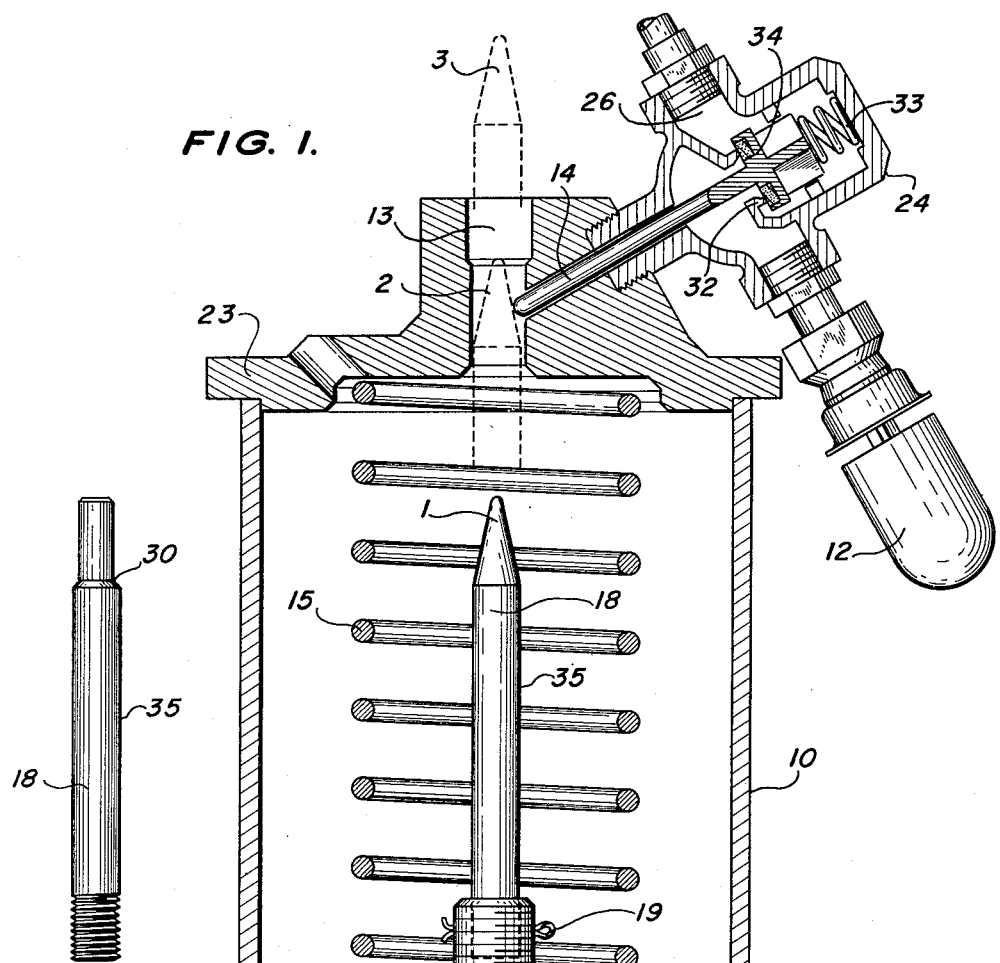
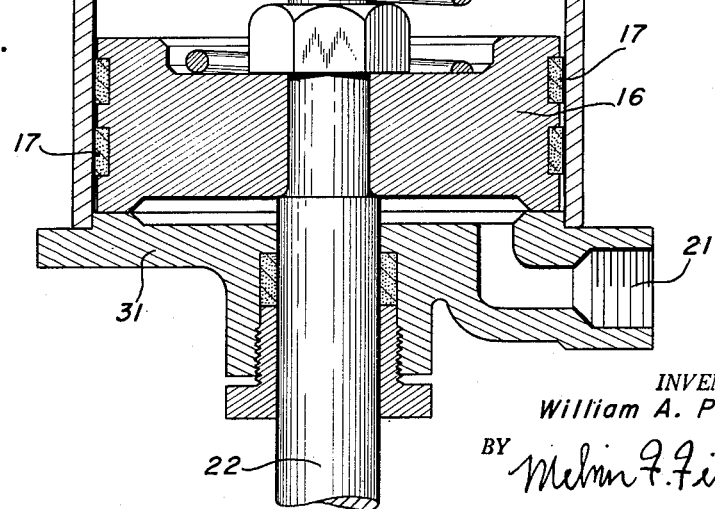
INVENTOR.
William A. Pitts,
BY Melvin F. Fincke
ATTORNEY.

United States Patent Office 2,759,448
Patented Aug. 21, 1956

2,759,448

WARNING DEVICE FOR PISTON CYLINDERS

William A. Pitts, Bellaire, Tex., assignor, by mesne assignments, to Esso Research and Engineering Company, Elizabeth, N. J., a corporation of Delaware Application September 30, 1953, Serial No. 383,188

3 Claims. (Cl. 116—124)

This invention relates to a warning device for indicating the overtravel of a piston utilized in fluid pressure braking systems. More particularly my invention relates to a means for indicating the amount of overtravel of the piston to thereby keep the operator of the braking system in constant touch with the amount of overtravel and obviate any adjusting of the piston within the piston cylinder unless the amount of overtravel is excessive. Also my invention provides a means for permitting the piston to continue in operation and to continue to travel to the end of its stroke even though the stroke is beyond that commensurate with optimum brake performance.

Warning devices have been utilized in braking systems to indicate an overtravel of the piston within a piston cylinder caused by wear of the brake shoes or wear in the joints between the parts or by any other cause. However, such warning devices are positioned within the piston cylinder system so that the warning is given immediately upon an overtravel of the piston and requires, in order to give such a warning, the impingement upon the cylinder head of some member attached to the piston. The cylinder head inhibits the overtravel of the piston and because of the impingement of the member upon the cylinder head often causes damage to the piston cylinder. An instrument, therefore, which gives a signal upon the overtravel of the piston and yet does not have a member which impinges upon the cylinder head is a highly desirable instrument. Furthermore, in previous overtravel warning devices the warning given has not given the operator an indication of approximately how much overtravel is present. Instead, they have merely given him an indication that there is overtravel. In actual braking operations, for example, an adjustment of the mechanism may not be necessary just because there is an overtravel of the piston but such an adjustment can often be delayed until there is an excessive amount of overtravel without substantially decreasing the efficiency of the braking system.

It is an object, therefore, of this invention to provide a means for indicating an overtravel of a piston within a brake system which will not impinge upon the casing head of the piston cylinder and hence will not damage said casing head.

It is a further object of this invention to provide a means for indicating the amount of overtravel of a piston cylinder within a fluid operated brake system.

It is a still further object of this invention to remove the necessity of adjusting the piston cylinder until a predetermined amount of overtravel is evidenced.

Briefly, my invention consists of a warning device for indicating the overtravel of a movable member from a reference point. Attached to the movable member, the overtravel of which it is desired to measure, is a means for opening a valve to admit a fluid to a fluid operated warning device. After the valve is opened, the valve opening means and the movable member to which its is attached can continue its travel uninhibited.

More particularly my invention consists of an actuator rod which is mounted on the piston and a bore formed in the top head of the piston cylinder, said bore being positioned to permit the actuator rod to move longitudinally within the bore to a position above the casing head unobstructed by any member of the piston system with the exception of a valve stem, which valve stem when engaged allows a certain amount of air to be emitted into a warning device such as a whistle. Of course, the engagement of the actuator rod with the valve stem will not in any way harm or damage the piston cylinder head. Also since the valve stem is resilient no damage will occur to the actuator rod. The actuator rod may be cyindrical or may be tapered or step cut in such a manner as to vary the amount of movement of the valve stem when contacted by the rod so as to vary the volume of air from an air pressure source allowed to go through the warning device depending upon the amount of overtravel of the piston. It will be understood, of course, that any compressible fluid may be used instead of air.

Referring to the accompanying drawing which is made a part hereof.

Fig. 1 indicates a sectional view of my improved instrument, and

Fig. 2 is another embodiment of the actuator rod designed to give an indication of the amount of overtravel of the piston.

Referring now to the drawing, numeral 10 indicates a piston cylinder within which is coaxially mounted a piston 16, the piston being connected to a piston rod 22. The piston rod 22 is connected to that portion of the braking system (not shown) to be actuated thereby. The end of the piston rod 22 is drilled and threaded to receive a tapered actuator rod 18 which when assembled may be coaxial with the piston cylinder 10 and is held fast by cotter pin 19. The length of the actuator rod 18 determines the mount of travel of the piston 16 permitted before the warning device is actuated. The piston member 16 is provided with annular sealing members 17 to cause a seal between the piston 16 and the interior surface of the cylinder 10. Also mounted within the cylinder 10 is a resilient means 15, such as a coil spring, adapted to urge the piston 16 toward the lower head 31 of the piston cylinder. An inlet 21 is provided within the lower head member 31 to permit fluid to exert pressure against the under part of the piston 16 when the brakes are applied. The resultant pressure moves the piston longitudinally upwardly and when the piston reaches a predetermined position the piston rod 22 applies the brakes to which it is connected. The brakes are adjusted to apply before the actuator rod reaches position 2 for good operating characteristics and the remainder of the travel to position 2 is simply a margin for wear and adjustment of the brake. The cylinder head 23 is threaded to receive whistle valve 24. The whistle valve 24 consists of a valve stem 14, a valve seat 32 and a valve member 34 which is urged to a seating position by spring 33. The valve stem member 14 is so positioned within the cylinder head 23 that the valve stem extends into the outlet 13. Connected to a source of air pressure by means of an inlet 26 going through the valve member 24 is an audible means 12 such as a whistle.

In operation, therefore, when the brakes are applied the fluid pressure against the piston 16 causes the piston to move upwardly against the force of the spring member 15. If the wear on the brake lining or other parts of the system is such as to cause an overtravel of the piston to position 2, the actuator rod 18 contacts the valve stem 14 thereby partially opening the inlet 26 and permitting air to flow from the source through valve 24 and to whistle 12 to blow the whistle. Since the actuator rod is tapered, it can be seem that as the overtravel of the actuator rod increases, the valve stem is continually opened a larger amount thereby continually increasing the volume of air permitted to enter the whistle until a maximum position is reached when side 35 of actuator rod 18 engages the valve stem 14. With increased volume the intensity will increase and the tone of the whistle will change. Hence an experienced operator can get an audible indication of the amount of overtravel within the cylinder and can thereby tell at what point it will be necessary to make adjustments. It can also be seen that by the provision of bore 13, no member of the piston system impinges upon the upper cylinder head 23. Therefore, the head 23 cannot be damaged.

In Fig. 2 there is shown a second type of actuator rod which can be utilized in my improved warning device. As shown in Fig. 2, the actuator rod 18 is step cut at 30. Hence when such a step cut actuator rod is utilized, a certain tone will be heard by the operator as the amount of overtravel causes the actuator rod 18 to engage the valve stem but the amount of overtravel is not sufficient to completely open the valve member 24. When the overtravel becomes so great that the outer edge 35 of the actuator rod 18 engages the valve stem member 14, a louder and more intense sound will come from the whistle thereby indicating to the operator that adjustments are necessary.

It will be understood that alterations may be made in the relative sizes, shapes and positions of the parts of the apparatus of the present invention without departing from the spirit and scope thereof.

The nature and objects of the present invention having been completely described and illustrated, what I wish to claim as new and useful and secure by Letters Patent is:

1. In a device for indicating piston overtravel, a piston cylinder having a fluid inlet and a bored top head, a piston within said piston cylinder, resilient means normally urging said piston toward said fluid inlet, an actuator rod attached to said piston, an air operated warning device, a valve attached to said top head and connected to said warning device, said valve having only its valve stem protruding into said bore and adapted to permit a flow of air to said warning device, and said actuator rod being adapted to move longitudinally within said bore to engage said valve stem upon a certain overtravel of said piston.

2. In a device for indicating piston overtravel, a piston cylinder having a fluid inlet and a bored top head, a piston within said piston cylinder, resilient means normally urging said piston toward said fluid inlet, an actuator rod attached to said piston, an air operated warning device, a valve attached to said top head and connected to said warning device, said valve having a valve stem protruding into said bore and adapted to permit a flow of air to said warning device, and said actuator rod being adapted to move longitudinally in a direction away from said fluid inlet in response to an applied force against said piston to a point within said bore to engage said valve stem upon a certain overtravel of said piston.

3. In a device for indicating piston overtravel, a piston cylinder having a fluid inlet and a bored cylinder head, the bore of the cylinder head extending through said cylinder head, a piston within said piston cylinder, resilient means normally urging said piston toward said fluid inlet, an actuator rod attached to said piston, an air operated warning device connected to said piston cylinder, said warning device having a valve including a valve stem with said valve stem protruding into said bore, said actuator rod being positioned to move into the bore of said cylinder head and contact said valve stem to actuate said warning device upon any overtravel of said piston.

References Cited in the file of this patent

UNITED STATES PATENTS

| | | |
|---|---|---|
| 952,070 | Cota | Mar. 15, 1910 |
| 989,460 | Westphal | Apr. 11, 1911 |
| 1,365,786 | Kimble | Jan. 18, 1921 |
| 1,557,957 | Amheim | Oct. 20, 1925 |
| 2,615,419 | Topping | Oct. 28, 1952 |
| 2,632,420 | Crookston | Mar. 24, 1952 |